United States Patent
Maruyama et al.

(10) Patent No.: US 11,724,427 B2
(45) Date of Patent: Aug. 15, 2023

(54) PLASTICIZING APPARATUS, INJECTION MOLDING APPARATUS, AND THREE-DIMENSIONAL MODELING APPARATUS

(71) Applicant: Seiko Epson Corporation, Toyko (JP)

(72) Inventors: Hidenobu Maruyama, Azumino (JP); Kenta Anegawa, Matsumoto (JP)

(73) Assignee: SEIKO EPSON CORPORATION

( * ) Notice: Subject to any disclaimer, the term of this patent is extended or adjusted under 35 U.S.C. 154(b) by 175 days.

(21) Appl. No.: 17/330,595

(22) Filed: May 26, 2021

(65) Prior Publication Data
US 2021/0370566 A1 Dec. 2, 2021

(30) Foreign Application Priority Data
May 27, 2020 (JP) .................. 2020-092197

(51) Int. Cl.
*B29C 45/60* (2006.01)
*B29C 45/62* (2006.01)
(Continued)

(52) U.S. Cl.
CPC .............. *B29C 45/60* (2013.01); *B29C 45/47* (2013.01); *B29C 45/62* (2013.01); *B29C 45/74* (2013.01); *B29C 64/209* (2017.08); *B29C 64/295* (2017.08); *B29C 64/314* (2017.08); *B33Y 30/00* (2014.12); *B33Y 40/10* (2020.01)

(58) Field of Classification Search
CPC .... B29C 64/118; B29C 45/73; B29C 45/7331
See application file for complete search history.

(56) References Cited

U.S. PATENT DOCUMENTS 3,754,848 A * 8/1973 Choate ................ B29C 45/0441
425/589
5,209,937 A * 5/1993 Kangas ................ F04C 13/002
425/192 R
(Continued)

FOREIGN PATENT DOCUMENTS

JP     2009-269182 A     11/2009

*Primary Examiner* — Matthew J Daniels
*Assistant Examiner* — Andrew L Swanson
(74) *Attorney, Agent, or Firm* — Harness, Dickey & Pierce, P.L.C.

(57) ABSTRACT

A plasticizing apparatus includes a drive motor, a rotor rotated by the drive motor and having a groove-forming surface provided with a groove, a barrel facing the groove-forming surface and having a communication hole, an enclosure that accommodates the rotor, a heating section that heats a material, and a wear suppressor provided in at least one of the portion between the rotor and the barrel and the portion between the rotor and the enclosure. When the wear suppressor is provided between the rotor and the barrel, the wear suppressor is fixed to the rotor or the barrel and has Vickers hardness higher than the Vickers hardness of one of the rotor and the barrel, the one to which the wear suppressor is fixed, whereas when the wear suppressor is provided between the rotor and the enclosure, the wear suppressor is fixed to the rotor or the enclosure and has Vickers hardness higher than the Vickers hardness of one of the rotor and the enclosure, the one to which the wear suppressor is fixed.

6 Claims, 10 Drawing Sheets

(51) Int. Cl.
    *B29C 45/74*      (2006.01)
    *B29C 45/47*      (2006.01)
    *B33Y 40/10*      (2020.01)
    *B29C 64/209*     (2017.01)
    *B29C 64/314*     (2017.01)
    *B33Y 30/00*      (2015.01)
    *B29C 64/295*     (2017.01)

(56) References Cited

U.S. PATENT DOCUMENTS

| | | | | |
|---|---|---|---|---|
| 5,565,277 A | * | 10/1996 | Cox, Jr. | B32B 15/015 |
| | | | | 138/143 |
| 2007/0184146 A1 | * | 8/2007 | Takeuchi | B29C 45/53 |
| | | | | 425/589 |
| 2019/0061243 A1 | * | 2/2019 | Saito | B29B 7/823 |

* cited by examiner

PLASTICIZING APPARATUS, INJECTION MOLDING APPARATUS, AND THREE-DIMENSIONAL MODELING APPARATUS

The present application is based on, and claims priority from JP Application Serial Number 2020-092197, filed May 27, 2020, the disclosure of which is hereby incorporated by reference herein in its entirety.

BACKGROUND

1. Technical Field

The present disclosure relates to a plasticizing apparatus, an injection molding apparatus, and a three-dimensional modeling apparatus.

2. Related Art

JP-A-2009-269182 discloses a plasticization and delivery apparatus including a rotor provided with a spiral groove, a barrel so disposed as to face the rotor, and a casing that accommodates the rotor and the barrel. The plasticization and delivery apparatus plasticizes a material supplied to the portion between the rotating rotor and the barrel and delivers the plasticized material via an opening provided in a central portion of the barrel.

In the apparatus described above, a hardened rotor, barrel, and casing may be used in order to suppress wear of a rotor-casing facing portion and a rotor-barrel facing portion. It is, however, difficult to cut a hardened rotor, barrel, and casing to form grooves and holes therein, resulting, for example, in an increase in processing cost.

SUMMARY

According to a first aspect of the present disclosure, a plasticizing apparatus is provided. The plasticizing apparatus includes a drive motor, a rotor rotated by the drive motor and having a groove-forming surface provided with a groove, a barrel facing the groove-forming surface and having a communication hole, an enclosure that accommodates the rotor, a heating section that heats a material supplied to a portion between the rotor and the barrel, and a wear suppressor provided in at least one of the portion between the rotor and the barrel and a portion between the rotor and the enclosure. When the wear suppressor is provided between the rotor and the barrel, the wear suppressor is fixed to the rotor or the barrel and has Vickers hardness higher than Vickers hardness of one of the rotor and the barrel, the one to which the wear suppressor is fixed, whereas when the wear suppressor is provided between the rotor and the enclosure, the wear suppressing portion is fixed to the rotor or the enclosure and has Vickers hardness higher than the Vickers hardness of one of the rotor and the enclosure, the one to which the wear suppressor is fixed.

According to a second aspect of the present disclosure, an injection molding apparatus is provided. The injection molding apparatus includes a plasticizer that plasticizes a material and a nozzle via which the material plasticized by the plasticizer is injected into a molding die. The plasticizer includes a drive motor, a rotor rotated by the drive motor and having a groove-forming surface provided with a groove, a barrel facing the groove-forming surface and having a communication hole, an enclosure that accommodates the rotor, a heating section that heats the material supplied to a portion between the rotor and the barrel, and a wear suppressor provided in at least one of the portion between the rotor and the barrel and a portion between the rotor and the enclosure. When the wear suppressor is provided between the rotor and the barrel, the wear suppressor is fixed to the rotor or the barrel and has Vickers hardness higher than Vickers hardness of one of the rotor and the barrel, the one to which the wear suppressor is fixed, whereas when the wear suppressor is provided between the rotor and the enclosure, the wear suppressor is fixed to the rotor or the enclosure and has Vickers hardness higher than the Vickers hardness of one of the rotor and the enclosure, the one to which the wear suppressor is fixed.

According to a third aspect of the present disclosure, a three-dimensional modeling apparatus is provided. The three-dimensional modeling apparatus includes a plasticizer that plasticizes a material and a nozzle via which the material plasticized by the plasticizer is discharged onto a stage. The plasticizer include a drive motor, a rotor rotated by the drive motor and having a groove-forming surface provided with a groove, a barrel facing the groove-forming surface and having a communication hole, an enclosure that accommodates the rotor, a heating section that heats the material supplied to a portion between the rotor and the barrel, and a wear suppressor provided in at least one of the portion between the rotor and the barrel and a portion between the rotor and the enclosure. When the wear suppressor is provided between the rotor and the barrel, the wear suppressor is fixed to the rotor or the barrel and has Vickers hardness higher than Vickers hardness of one of the rotor and the barrel, the one to which the wear suppressor is fixed, whereas when the wear suppressor is provided between the rotor and the enclosure, the wear suppressor is fixed to the rotor or the enclosure and has Vickers hardness higher than the Vickers hardness of one of the rotor and the enclosure, the one to which the wear suppressor is fixed.

DESCRIPTION OF EXEMPLARY EMBODIMENTS

A. First Embodiment

Figure 1:
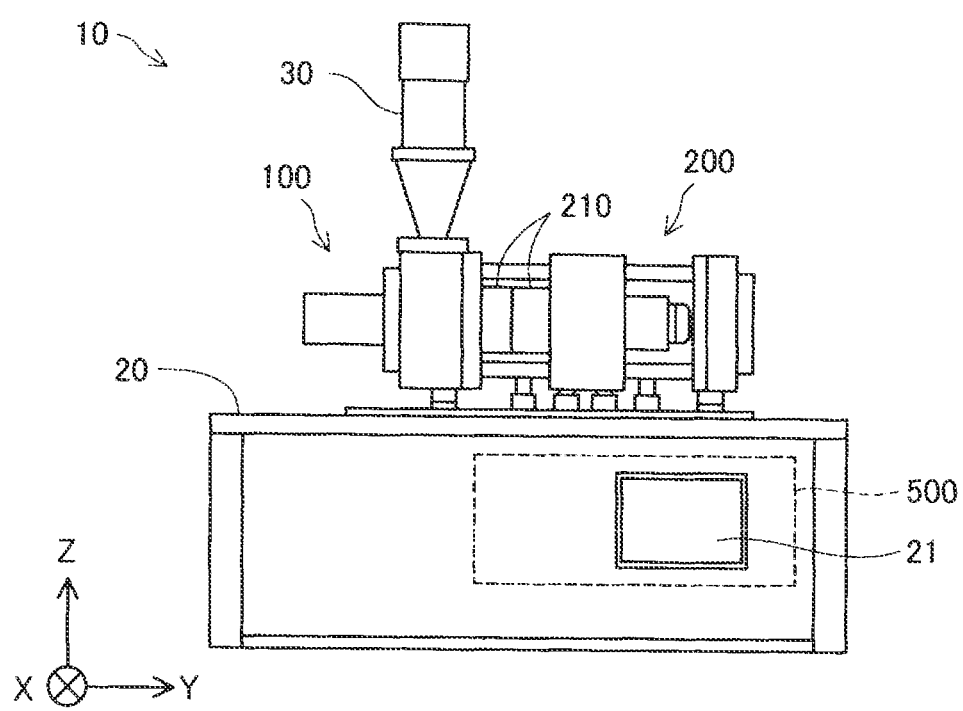
FIG. 1 is a front view showing a schematic configuration of an injection molding apparatus according to a first embodiment.

FIG. 1 is a front view showing a schematic configuration of an injection molding apparatus 10 according to a first embodiment. FIG. 1 shows arrows indicating directions X, Y, and Z perpendicular to one another. The directions X and Y are parallel to the horizontal plane, and the direction Z is opposite to the gravitational direction. The arrows indicating the directions X, Y, and Z are shown as appropriate also in the other figures in such a way that the directions shown in the other figures correspond to those in FIG. 1. In the following description, positive and negative signs are also used to specify an orientation in the direction notation as follows: "+" represents a positive direction, which is the direction indicated by an arrow; and "−" represents a negative direction, which is the direction opposite to the direction indicated by the arrow.

The injection molding apparatus 10 includes an injector 100, a mold clamper 200, and a controller 500. The injection molding apparatus 10 injects a molten material from the injector 100 into a molding die 210 attached to the mold clamper 200 to form a molded product. In the present embodiment, a metal molding die 210 is attached to the mold clamper 200. The molding die 210 attached to the mold clamper 200 is not necessarily made of metal and may instead be made of resin or ceramic. The metal molding die 210 is called a die in some cases.

The injector 100 and the mold clamper 200 are each fixed to a base 20. A hopper 30, into which the material of a molded product is loaded, is connected to the injector 100. The material of a molded product is, for example, thermoplastic resin, such as ABS resin or polypropylene shaped into a pellet. The material of a molded product may instead, for example, be thermoplastic resin to which powdery metal is added or thermoplastic resin to which carbon nanotubes are added. The injector 100 plasticizes the material supplied from the hopper 30 into a molten material and injects the molten material into the molding die 210 attached to the mold clamper 200. The term "plasticization" means that a material having thermal plasticity is heated and melted. The term "molten" means not only that a material having thermal plasticity is heated to a temperature higher than or equal to the melting point of the material to turn into a liquid form but that the material having thermal plasticity softens when heated to a temperature higher than or equal to the glass transition point so that the material exhibits fluidity.

The controller 500 is formed of a computer including one or more processors, a primary storage device, and an input/output interface via which signals are inputted from and outputted to an external apparatus. The controller 500 performs a variety of functions when the processor executes a program or an instruction read into the primary storage device. The controller 500 controls the injector 100 and the mold clamper 200 in accordance with molding conditions inputted in advance. The molding conditions are conditions under which the injection molding apparatus 10 forms a molded product. For example, a user or any other operator operates an operation panel 21 provided at the base 20 to input the molding conditions to the controller 500. The molding conditions to be inputted include, for example, injection pressure representing the pressure under which the molten material is injected into the molding die 210, an injection speed representing the flow speed of the molten material injected into the molding die 210, and an injection quantity representing the amount of molten material injected into the molding die 210. The controller 500 is not necessarily formed of a computer and may instead be achieved by the combination of a plurality of circuits that achieve at least a part of the functions of the controller 500.

Figure 2:
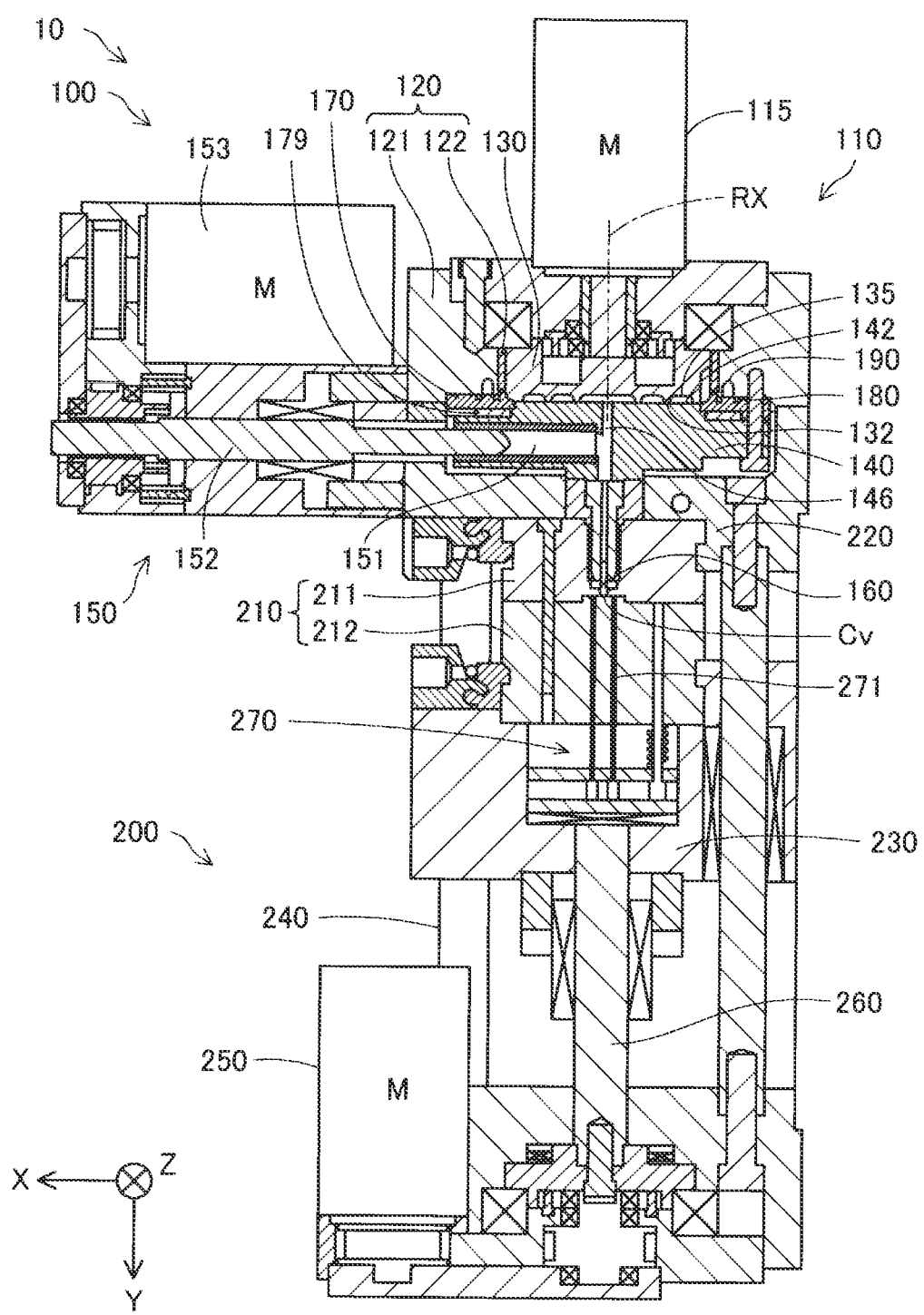
FIG. 2 is a cross-sectional view showing a schematic configuration of the injection molding apparatus according to the first embodiment.

FIG. 2 is a cross-sectional view showing a schematic configuration of the injection molding apparatus 10 according to the present embodiment. FIG. 2 shows cross sections of the injector 100, the mold clamper 200, and the molding die 210 described above. The injector 100 includes a plasticizer 110, an injection control mechanism 150, and a nozzle 160. The plasticizer 110 is called a plasticizing apparatus in some cases.

The plasticizer 110 includes a drive motor 115, a screw enclosure 120, a flat screw 130, a barrel 140, and a heating section 148, which will be described later. The plasticizer 110 has the function of plasticizing at least part of the pellet-shaped material supplied from the hopper 30 to generate a pasty molten material having fluidity and supplying the molten material to the injection control mechanism 150. The flat screw 130 is called a rotor in some cases.

The screw enclosure 120 includes a main body 121 and a wear suppressor 122 fixed to the main body 121. A cooling plate 170 is disposed between the main body 121 and the barrel 140. A heat insulating plate 179 is disposed between the main body 121 and the cooling plate 170. The specific configurations of the screw enclosure 120, the cooling plate 170, and the heat insulating plate 179 will be described later. The main body 121 is called an enclosure in some cases.

The flat screw 130 has a substantially circular columnar shape having a height along a center axis RX thereof that is smaller than the diameter thereof. The flat screw 130 is accommodated in the space surrounded by the screw enclosure 120 and the barrel 140. The flat screw 130 has a groove forming surface 132 provided with grooves 135 at a surface of the flat screw 130 that is the surface facing the barrel 140. A drive motor 115 is coupled to the opposite surface of the flat screw 130 from the groove forming surface 132. The drive motor 115 is driven under the control of the controller 500. The torque generated by the drive motor 115 rotates the flat screw 130 around the center axis RX.

Figure 3:
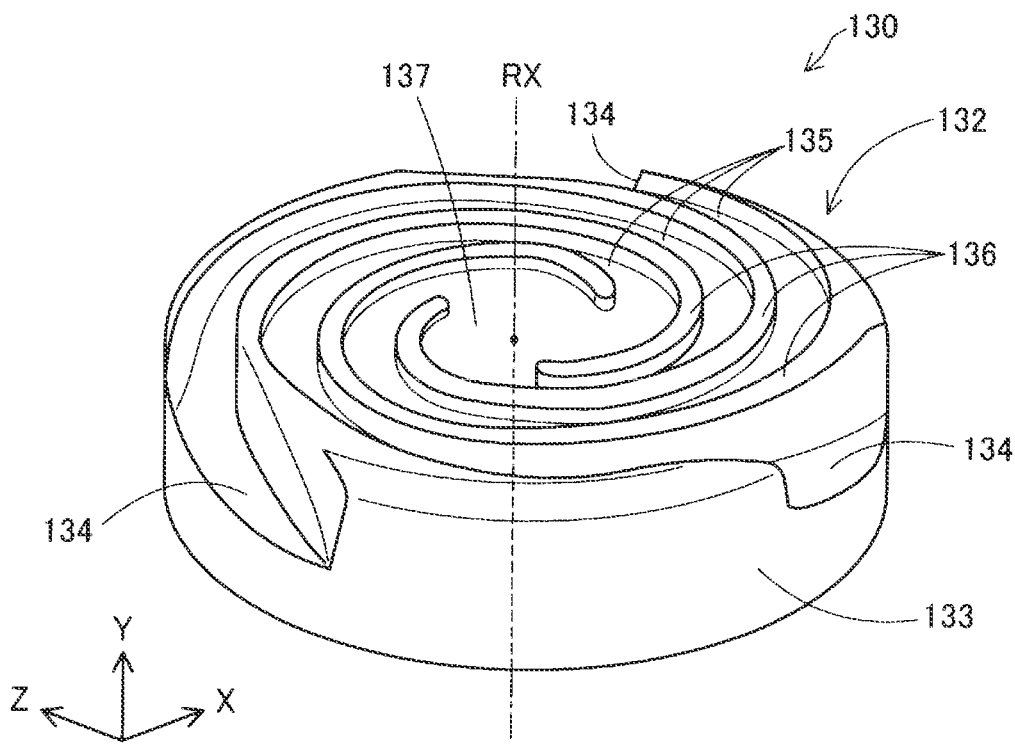
FIG. 3 is a perspective view showing a configuration of a flat screw.

FIG. 3 is a perspective view showing the configuration of the flat screw 130. In FIG. 3, the position of the center axis RX of the flat screw 130 is drawn with a chain line. As described above, the groove forming surface 132 of the flat screw 130 is provided with the grooves 135. A central section 137 of the groove forming surface 132 of the flat screw 130 is configured in the form of a recess to which one end of the grooves 135 is connected. The central section 137 is so provided that the center axis RX passes therethrough.

The grooves 135 of the flat screw 130 form what is called a scroll groove. The grooves 135 are provided in the form of vortices that arcuately extend from the central section 137 toward the outer circumference of the flat screw 130. The grooves 135 may be provided in the form of spirals or involute curves. The groove forming surface 132 is provided with protruding stripes 136, which form the side walls of the grooves 135. The grooves 135 are continuous to material introduction ports 134 provided at a side surface 133 of the flat screw 130. The material introduction ports 134 are portions via which the grooves 135 receive the material.

FIG. 3 shows an example of the flat screw 130 having three grooves 135 and three protruding stripes 136. The number of grooves 135 and protruding stripes 136 provided as part of the flat screw 130 is not limited to three. The flat screw 130 may be provided with only one groove 135 or two or more grooves 135. An arbitrary number of protruding stripes 136 may be provided in accordance with the number of grooves 135.

FIG. 3 shows an example of the flat screw 130 having the material introduction ports 134 formed at three locations. The number of material introduction ports 134 provided in the flat screw 130 is not limited to three. The material introduction port 134 may be provided at only one location or at two or more locations on the flat screw 130.

Figure 4:
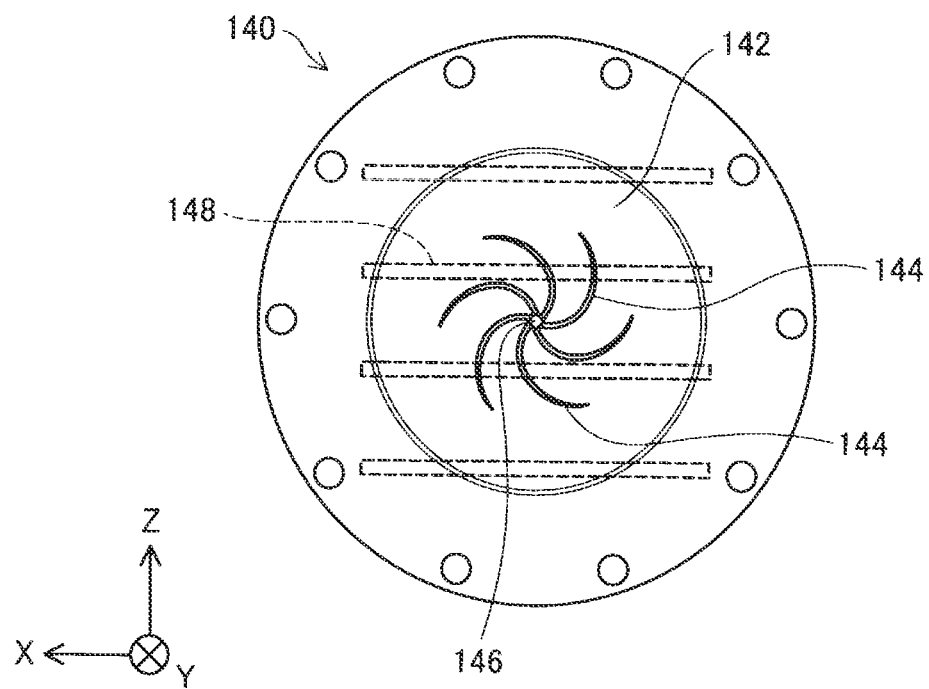
FIG. 4 is a descriptive diagram showing a configuration of a barrel.

FIG. 4 is a descriptive diagram showing the configuration of the barrel 140. The barrel 140 has a screw facing surface 142, which faces the groove forming surface 132 of the flat screw 130, as shown in FIGS. 2 and 4. A communication hole 146, which communicates with the injection control mechanism 150 and the nozzle 160, is provided at the center of the screw facing surface 142. The communication hole 146 is so provided that an extension of the center axis RX of the flat screw 130 passes through the communication hole 146. A plurality of guide grooves 144 are provided in the screw facing surface 142 around the communication hole 146. The guide grooves 144 each have one end connected to the communication hole 146 and extend in the form of vortices from the communication hole 146 toward the outer circumference of the screw facing surface 142. The guide grooves 144 each have the function of guiding the molten material to the communication hole 146. The screw facing surface 142 may not be provided with the guide grooves 144.

The heating section 148 is buried in the barrel 140, as shown in FIG. 4. In the present embodiment, the heating section 148 is formed of four rod-shaped heaters. The temperature of the heating section 148 is controlled by the controller 500. The material supplied to the grooves 135 of the flat screw 130 is plasticized by the rotation of the flat screw 130 and the heat provided by the heating section 148 to turn into a molten material, which is supplied to the injection control mechanism 150 via the communication hole 146.

The injection control mechanism 150 includes an injection cylinder 151, a plunger 152, and a plunger driver 153, as shown in FIG. 2. The injection control mechanism 150 has the function of injecting the molten material in the injection cylinder 151 into the molding die 210 via the nozzle 160. The injection cylinder 151 is a substantially cylindrical member connected to the communication hole 146 of the barrel 140. The molten material supplied via the communication hole 146 of the plasticizer 110 is stored in the injection cylinder 151. The plunger 152 is a shaft-shaped member disposed in the injection cylinder 151. The plunger driver 153 moves the plunger 152 along the center axis of the injection cylinder 151. The plunger driver 153 is formed, for example, of a motor and gears. The plunger driver 153 is driven under the control of the controller 500. As the plunger 152 moves in the injection cylinder 151, the molten material stored in the injection cylinder 151 is pumped into the molding die 210 via the nozzle 160.

The molding die 210 includes a fixed die 211 and a movable die 212. The movable die 212 and the fixed die 211 are so disposed as to face each other, and a cavity Cv is created therebetween and is a space corresponding to the shape of a product to be molded. The cavity Cv is filled with the molten material injected via the nozzle 160.

The mold clamper 200 includes a fixed disc 220, a movable disc 230, a tie bar 240, a die driver 250, and a ball screw 260. The mold clamper 200 has the function of separating and joining the movable die 212 and the fixed die 211. The fixed disc 220 is fixed to the front end of the tie bar 240. The movable disc 230 is configured to be movable along the tie bar 240. The fixed die 211 is fixed to the fixed disc 220, and the movable die 212 is fixed to the movable disc 230. The fixed die 211 and the movable die 212 are fixed, for example, with bolts or clamps. In the present embodiment, the die driver 250 is formed, for example, of a motor and gears. The die driver 250 is driven under the control of the controller 500. The die driver 250 is coupled to the movable disc 230 via the ball screw 260. The ball screw 260 transmits the power generated by the die driver 250 to the movable disc 230 to move the movable disc 230 along the tie bar 240. The movement of the movable disc 230 moves the movable die 212 relative to the fixed die 211. In other words, the movement of the movable disc 230 opens or closes the molding die 210.

The injection molding apparatus 10 is provided with an extrusion mechanism 270 including an ejector pin 271, which releases the molded product from the molding die 210. The ejector pin 271 is inserted into a through hole provided in the movable die 212. The ejector pin 271 protrudes from the movable die 212 when the mold is opened and pushes the molded product out of the movable die 212.

Figure 5:
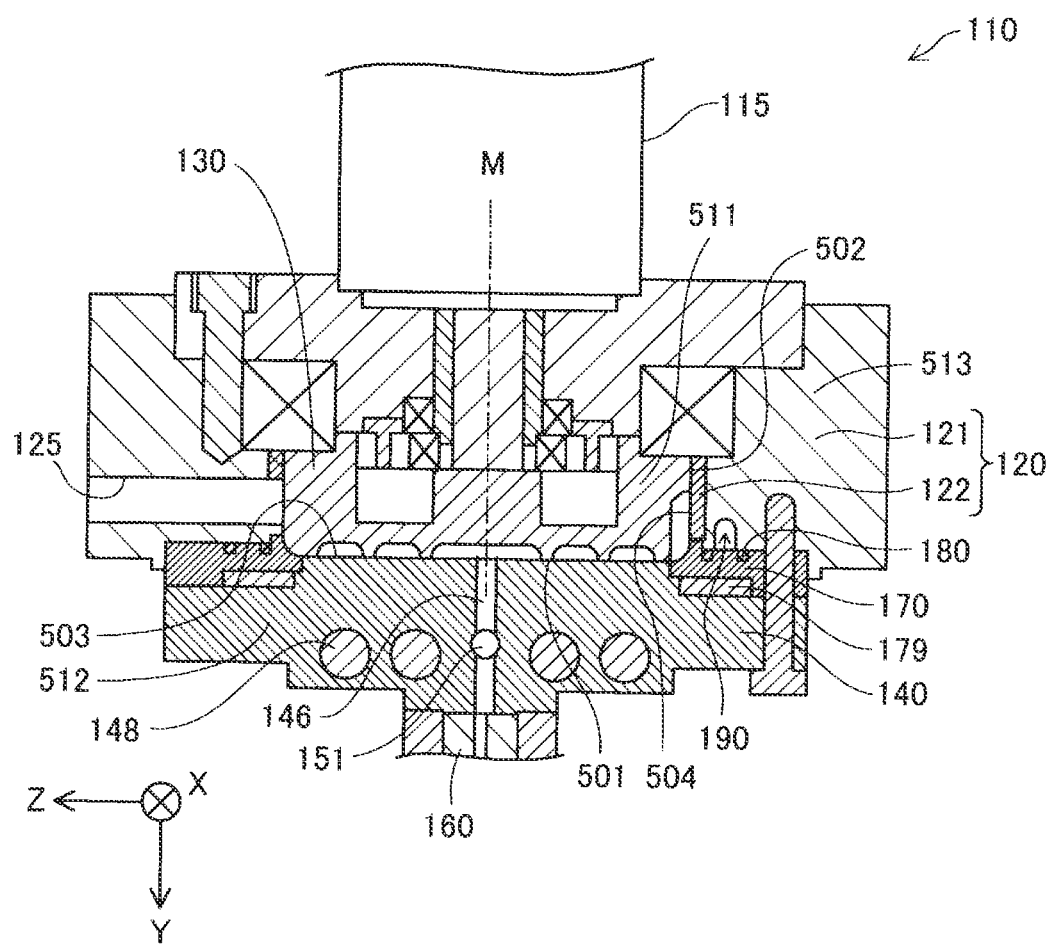
FIG. 5 is a cross-sectional view showing a configuration of a plasticizer.
Figure 6:
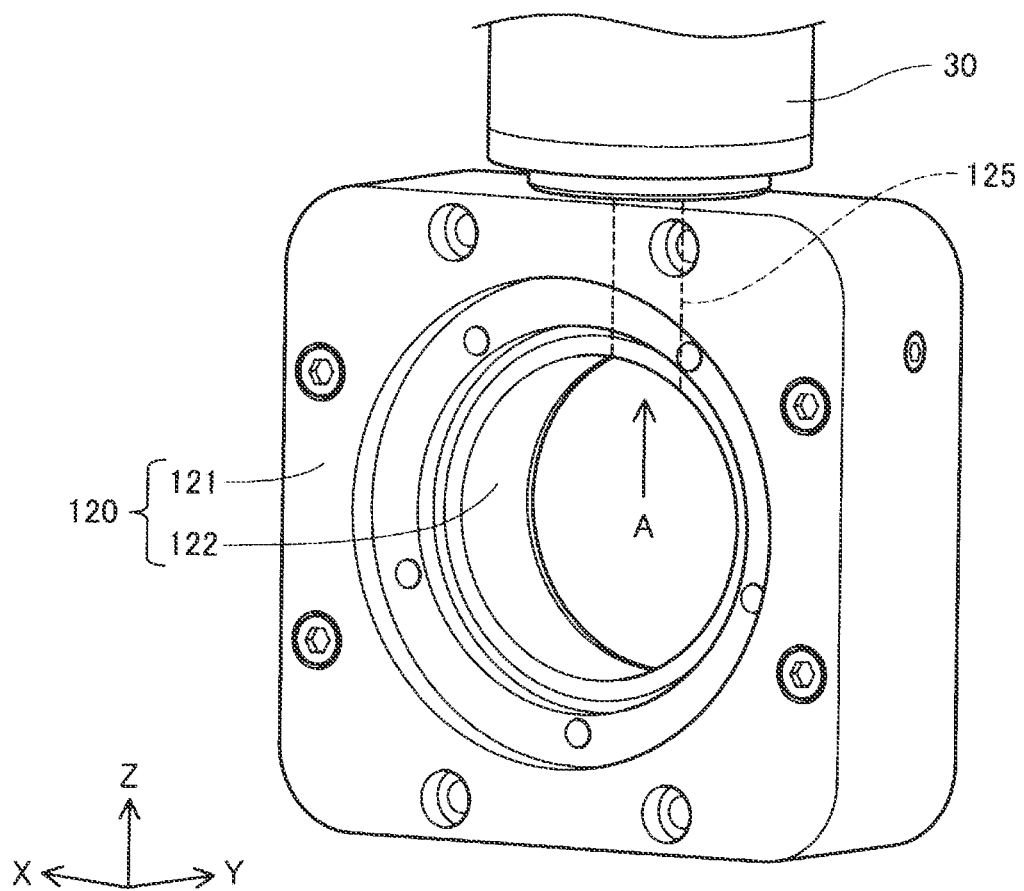
FIG. 6 is a first perspective view showing a configuration of an enclosure.
Figure 7:
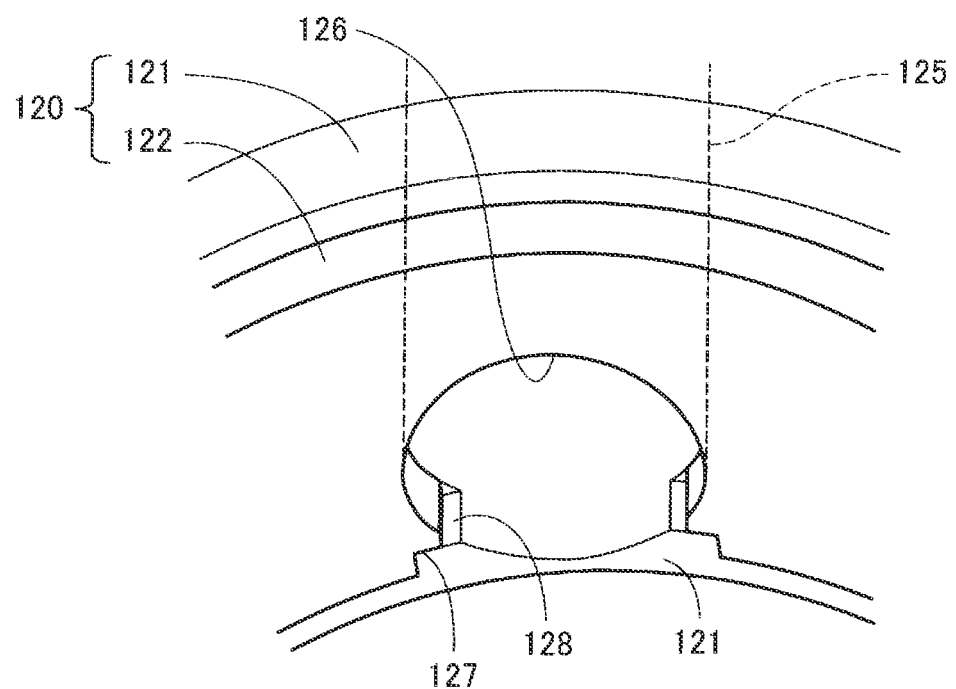
FIG. 7 is a second perspective view showing the configuration of the enclosure.

FIG. 5 is a cross-sectional view showing the configuration of the plasticizer 110. FIG. 6 is a first perspective view showing the configuration of the screw enclosure 120. FIG. 7 is a second perspective view showing the configuration of the screw enclosure 120. FIG. 5 shows a cross section of the plasticizer 110 viewed in a direction different from the direction in which the injection molding apparatus 10 is viewed in FIG. 2. The flat screw 130 includes a first facing section 501, which faces the barrel 140, a second facing section 502, which faces the screw enclosure 120, and a first non-facing section 511, as shown in FIG. 5. The barrel 140 includes a third facing section 503, which faces the first facing section 501 of the flat screw 130, and a second non-facing section 512. The screw enclosure 120 includes a fourth facing section 504, which faces the second facing section 502 of the flat screw 130, and a third non-facing section 513.

At least one of the first facing section 501, the second facing section 502, the third facing section 503, and the fourth facing section 504 is provided at the surface of a member having undergone hardening. The hardening means, for example, a heat treatment of heating a steel material, such as carbon steel or stainless steel, until the metal structure thereof transitions to an austenite structure and then rapidly cooling the steel material to cause it to transition to a martensite structure.

At least one of the hardness of the first non-facing section 511, the hardness of the second non-facing section 512, and the hardness of the third non-facing section 513 is lower than the hardness of the first facing section 501, the hardness of the second facing section 502, the hardness of the third facing section 503, and the hardness of the fourth facing section 504. The hardness means a value measured in the Vickers hardness test (JIS Z 2244).

In the present embodiment, the flat screw 130 is entirely made of SUS440C, which is hardened stainless steel. The barrel 140 is entirely made of SUS440C, which is hardened stainless steel. In the present embodiment, the screw enclosure 120 includes the main body 121 and the wear suppressor 122, as described above, as shown in FIG. 6. The wear suppressor 122 is disposed between the main body 121 and the flat screw 130 and fixed to the main body 121 in a press fit process. The fourth facing section 504 is provided at the surface of the wear suppressor 122, and the third non-facing section 513 is provided at the surface of the main body 121 and in the interior thereof. The main body 121 is made of SUS440, which is non-hardened stainless steel. The wear suppressor 122 is made of SUS440C, which is hardened stainless steel. That is, in the present embodiment, the first facing section 501, the second facing section 502, the third facing section 503, and the fourth facing section 504 are each provided at the surface of a hardened member, the first non-facing section 511 and the second non-facing section 512 are each provided at the surface of a hardened member and in the interior thereof, and the third non-facing section 513 is provided at the surface of a non-hardened member and in the interior thereof.

The Vickers hardness of SUS440, which is a non-hardened stainless steel, is about 230 HV, and the Vickers hardness of SUS440C, which is hardened stainless steel, ranges from 610 to 650 HV. The wear suppressor 122 therefore has hardness higher than the hardness of the main body 121 and has the same hardness as the hardness of the flat screw 130 and the hardness of the barrel 140. In other words, the hardness of the third non-facing section 513 is lower than the hardness of the first facing section 501, the hardness of the second facing section 502, the hardness of the third facing section 503, the hardness of the fourth facing section 504, the hardness of the first non-facing section 511, and the hardness of the second non-facing section 512.

FIG. 7 shows the screw enclosure 120 viewed in the direction labeled with the arrow A in FIG. 6. The main body 121 of the screw enclosure 120 is provided with a material supply port 125, to which the hopper 30 is connected, as shown in FIG. 7. The wear suppressor 122 of the screw enclosure 120 is provided with a cutout 126, which prevents the material supply port 125 from being blocked by the wear suppressor 122. In the present embodiment, the main body 121 is provided with a protrusion 127, and the wear suppressor 122 is provided with a recess 128. The configuration in which the protrusion 127 engages with the recess 128 suppresses rotation of the wear suppressor 122 along with the flat screw 130 relative to the main body 121.

Figure 8:
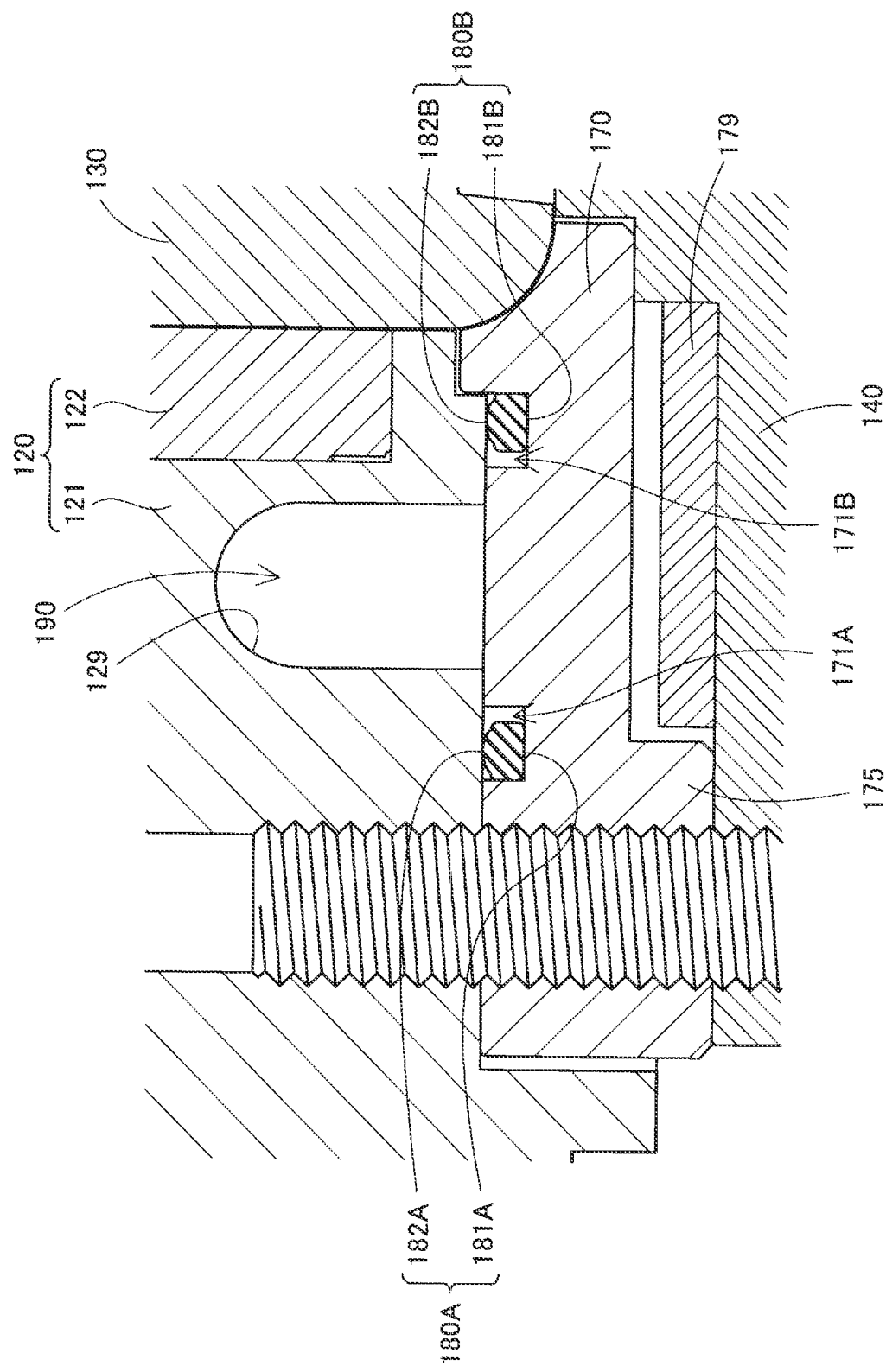
FIG. 8 is a cross-sectional view showing a configuration of a refrigerant channel.

FIG. 8 is a cross-sectional view showing the configuration of refrigerant channel 190. The screw enclosure 120 is provided with a channel groove 129. The channel groove 129 is provided along the circumferential direction of the flat screw 130. The cooling plate 170 is disposed between the main body 121 and the barrel 140. The cooling plate 170 has a planar surface and is so fixed to the main body 121 that the planar surface covers the channel groove 129. In the present embodiment, the main body 121, the cooling plate 170, and the barrel 140 are fixed to each other with bolts. The refrigerant channel 190, along which a refrigerant flows, is defined by the channel groove 129 and the cooling plate 170. In the present embodiment, water is used as the refrigerant. The refrigerant is supplied, for example, from a pump (not shown). The cooling plate 170 is called a lid member in some cases.

The cooling plate 170 is provided with two seal grooves 171A and 171B, which sandwich the channel groove 129. The aforementioned planar surface that covers the channel groove 129 is provided between the two seal grooves 171A and 171B. The seal grooves 171A and 171B each have a planar bottom surface and side wall surfaces facing each other. Seal members 180A and 180B, which seal the refrigerant channel 190, are disposed in the seal grooves 171A and 171B, respectively. In the present embodiment, the seal grooves 171A and 171B are each provided in the form of an annulus along the channel groove 129. The seal members 180A and 180B each have an annular shape. The seal members 180A and 180B are each made of a rubber material. In the present embodiment, the seal members 180A and 180B are each made of fluororubber.

In the following description, the seal groove 171A provided on the outer side of the channel groove 129 is called an outer circumferential seal groove 171A in some cases, the seal groove 171B provided on the inner side of the channel groove 129 is called an inner circumferential seal groove 171B in some cases, the seal member 180A disposed in the outer circumferential seal groove 171A is called an outer circumferential seal member 180A in some cases, and the seal member 180B disposed in the inner circumferential seal groove 171B is called an inner circumferential seal member 180B in some cases. When the outer circumferential seal groove 171A and the inner circumferential seal groove 171B are not distinguished from each other in the description, they are simply called seal grooves 171. When the outer circumferential seal member 180A and the inner circumferential seal member 180B are not distinguished from each other in the description, they are simply called seal members 180. In FIG. 8, components related to the outer circumferential seal groove 171A and the outer circumferential seal member 180A are each given a reference character having a suffix "A", and components related to the inner circumferential seal groove 171B and the inner circumferential seal member 180B are each given a reference character having a suffix "B". When the following description is so made that components are not distinguished from each other in terms of what the components belong to, the reference characters given to the components do not have the suffix "A" or "B".

Figure 9:
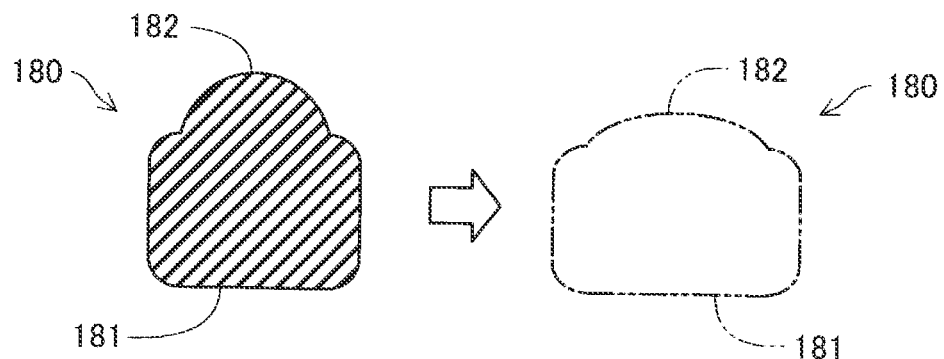
FIG. 9 is a cross-sectional view showing a configuration of a seal member.

FIG. 9 is a cross-sectional view showing the configuration of each of the seal members 180. In FIG. 9, the cross section of the seal member 180 before it is deformed is drawn with the solid line, and the cross section of the seal member 180 after it is deformed is drawn with the two-dot chain line. The seal member 180 includes a planar section 181 and a protruding stripe section 182, which protrudes from the planar section 181. In the cross section perpendicular to the circumferential direction of the seal member 180, the planar section 181 has a rectangular cross-sectional shape, and the protruding stripe section 182 has a dome-like cross-sectional shape protruding from one edge of the planar section 181. In the following description, a curved surface of the seal member 180 that is the curved surface provided at the protruding stripe section 182 is called an upper surface of the seal member 180, a planar surface of the seal member 180 that is the planar surface provided on the opposite side from the upper surface is called a bottom surface of the seal member 180, and planar surfaces of the seal member 180 that are the planar surfaces so provided as to be perpendicular to the bottom surface are called side surfaces of the seal member 180.

The outer circumferential seal member 180A is so disposed in the outer circumferential seal groove 171A that the bottom surface of the outer circumferential seal member 180A is in contact with the bottom surface of the outer circumferential seal groove 171A shown in FIG. 8 and the outer circumferential side surface of the outer circumferential seal member 180A is in contact with the outer circumferential side wall surface of the outer circumferential seal groove 171A. The inner circumferential seal member 180B is so disposed in the inner circumferential seal groove 171B that the bottom surface of the inner circumferential seal member 180B is in contact with the bottom surface of the inner circumferential seal groove 171B shown in FIG. 8 and the inner circumferential side surface of the inner circumferential seal member 180B is in contact with the inner circumferential side wall surface of the inner circumferential seal groove 171B. When the main body 121 and the cooling plate 170 are fixed to each other, the upper surfaces of the seal members 180A and 180B are crushed by the main body 121, so that the seal members 180A and 180B are deformed. When the seal members 180A and 180B are deformed, the seal members 180A and 180B come into intimate contact with the main body 121, the bottom surfaces of the seal grooves 171A and 171B, and the side wall surfaces of the seal grooves 171A and 171B, whereby the refrigerant channel 190 is reliably sealed. The pressure from the refrigerant flowing through the refrigerant channel 190 crushes the seal members 180A and 180B and improves the degree of the intimate contact of the seal members 180A and 180B with the main body 121, the bottom surfaces of the seal grooves 171A and 171B, and the side wall surfaces of the seal grooves 171A and 171B.

Part of the cooling plate 170 is in contact with the barrel 140, as shown in FIG. 8. In the present embodiment, the cooling plate 170 includes attachment sections 175 each provided with a bolt hole, and the attachment sections 175 are in contact with portions of the barrel 140 that are outside the screw facing surface 142. The heat insulating plate 179 is disposed between a portion of the cooling plate 170 that is the portion inside the attachment sections 175 and a portion of the barrel 140 that is the portion outside the screw facing surface 142. In the present embodiment, the heat insulating plate 179 has an annular shape. The thermal conductivity of the heat insulating plate 179 is lower than the thermal conductivity of the cooling plate 170. In the present embodiment, the cooling plate 170 is made of SUS440C, which is hardened stainless steel, and the heat insulating plate 179 is made of a composite material made of a primary base material formed of glass fibers and a primary material formed of a silicate-based binder.

Figure 10:
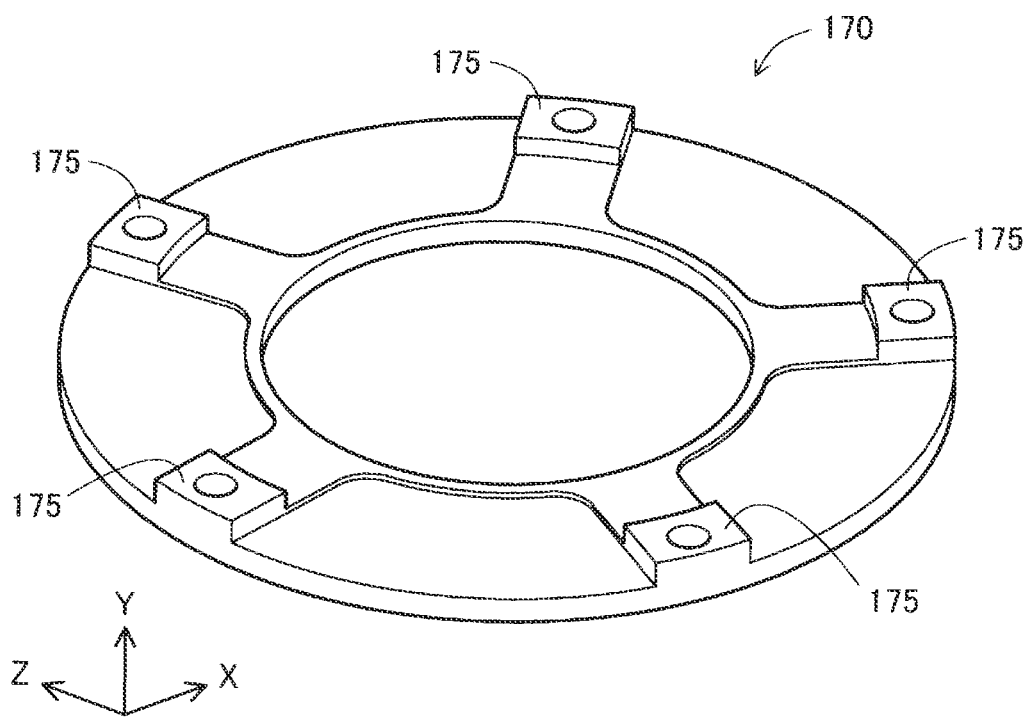
FIG. 10 is a perspective view showing a configuration of attachment sections of a cooling plate.

FIG. 10 is a perspective view showing the configuration of the attachment sections 175 of the cooling plate 170. In the present embodiment, the cooling plate 170 is provided with five attachment sections 175. The five attachment sections 175 are provided at equal intervals along the circumferential direction of the cooling plate 170.

In the injection molding apparatus 10 according to the present embodiment described above, the first facing section 501 and the second facing section 502 of the flat screw 130, the third facing section 503 of the barrel 140, and the fourth facing section 504 of the screw enclosure 120 are made of a material having relatively high hardness, and the third non-facing section 513 of the screw enclosure 120 is made of a material having relatively low hardness. The configuration described above can therefore ensure high wear resistance of each of the facing sections 501 to 504 to which the material is rubbed when the flat screw 130 rotates, and ensure that the third non-facing section 513 is readily cut. In particular, in the present embodiment, since the wear suppressor 122 is formed of a hardened member having increased wear resistance, the wear of the fourth facing section 504 can be effectively suppressed. Further, in the present embodiment, the third non-facing section 513 of the screw enclosure 120 is provided at the surface of the main body 121 and in the interior thereof, which have not been hardened, and the fourth facing section 504 of the screw enclosure 120 is provided at the surface of the wear suppressor 122, which has been hardened and is then fixed to the main body 121. Holes, grooves, and the like for attaching the drive motor 115, the cooling plate 170, and other components can therefore be readily formed by cutting the main body 121, and the wear resistance of the screw enclosure 120 can be readily ensured by fixing the wear suppressor 122 to the main body 121. The processing cost of the screw enclosure 120 can therefore be reduced with the wear resistance of the screw enclosure 120 ensured as compared with an aspect in which the entire screw enclosure 120 is hardened. Further, when the entire screw enclosure 120 is hardened, the dimensions of the screw enclosure 120 deviate from target dimensions in some cases due to the hardening. In the present embodiment, since the main body 121 is not hardened, the main body 121 can be formed with high dimensional accuracy.

Further, in the present embodiment, the seal members 180 each include the planar section 181 and the protruding stripe section 182, and the planar surfaces of the planar section 181 are in contact with the bottom surface and the side wall surfaces of the seal groove 171, whereby the contact area where the seal member 180 is in contact with the bottom surface or the side wall surfaces of the seal groove 171 can be readily ensured as compared with a seal member having a circular cross section. The refrigerant channel 190 can therefore be more reliably sealed. Further, the configuration in which the protruding stripe section 182 is in contact with the screw enclosure 120 can suppress a situation in which the seal member 180 is caught between the screw enclosure 120 and the cooling plate 170 when the cooling plate 170 covers the channel groove 129 of the screw enclosure 120. In particular, the plurality of seal members 180 are so disposed as to sandwich the channel groove 129 in the present embodiment, whereby the refrigerant channel 190 can be more reliably sealed.

Further, in the present embodiment, the attachment sections 175 of the cooling plate 170 are in contact with portions of the barrel 140 that are provided on the outer side the screw facing surface 142, whereby heat of the barrel 140 can be effectively transferred to the refrigerant via the cooling plate 170. The outer circumferential portion of the screw facing surface 142 is therefore kept at a temperature lower than the temperature of the central portion of the screw facing surface 142, whereby the material can be stably plasticized in the portion between the flat screw 130 and the barrel 140, and the plasticized material can be stably discharged via the communication hole 146. In particular, in the present embodiment, the configuration in which the five attachment sections 175 are arranged at equal intervals along the circumferential direction of the cooling plate 170 can suppress temperature unevenness that occurs in the screw facing surface 142 along the circumferential direction. Further, since a portion of the cooling plate 170 that is the portion inside the attachment sections 175 and a portion of the barrel 140 that is the portion outside the screw facing surface 142 are thermally insulated from each other by the heat insulating plate 179, an excessive decrease in the temperature in the central portion of the screw facing surface 142 is suppressed.

B. Second Embodiment

Figure 11:
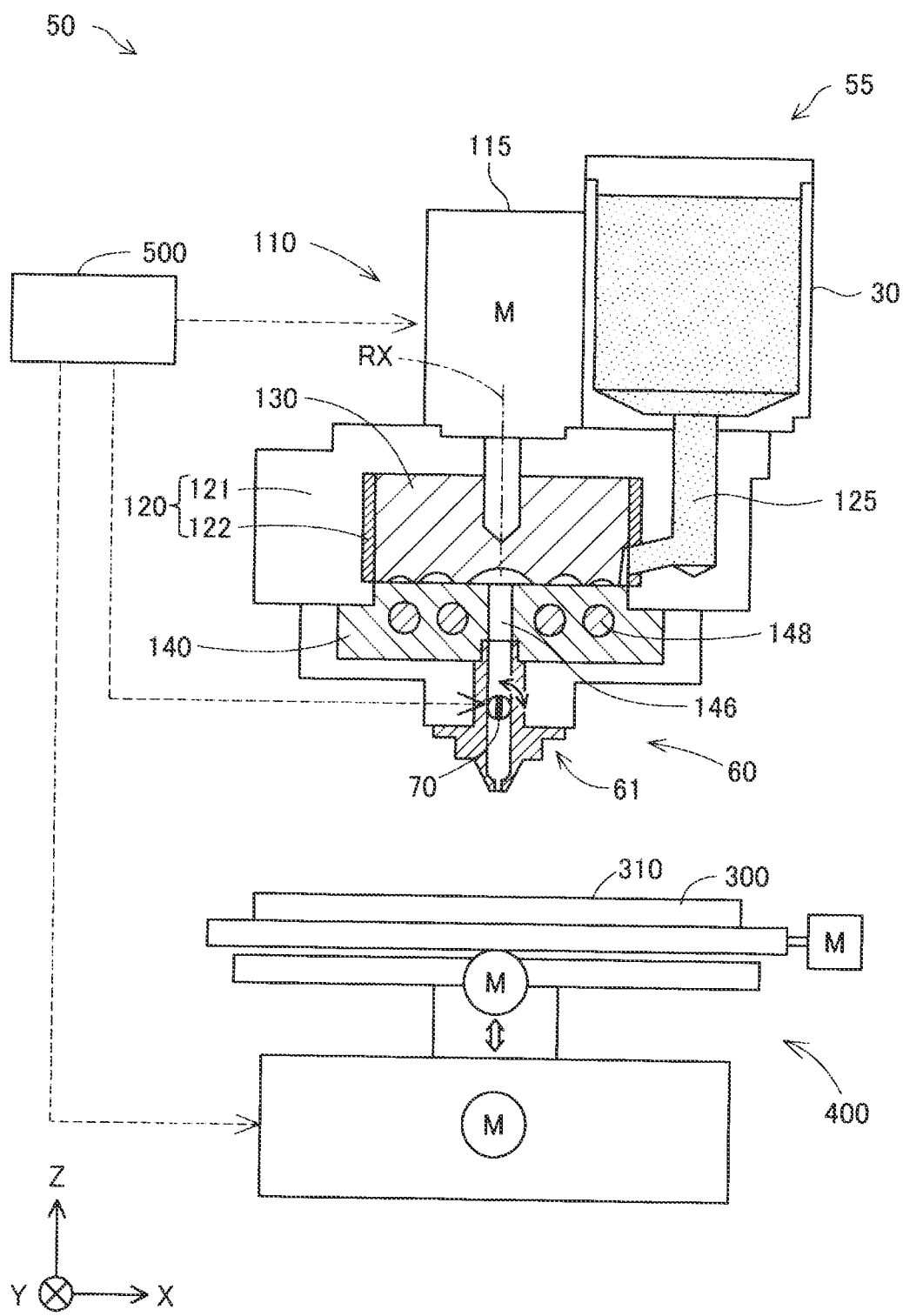
FIG. 11 is a cross-sectional view showing a schematic configuration of a three-dimensional modeling apparatus according to a second embodiment.

FIG. 11 is a cross-sectional view showing a schematic configuration of a three-dimensional modeling apparatus 50 according to a second embodiment. The three-dimensional modeling apparatus 50 includes a modeling unit 55, a stage 300, a movement mechanism 400, and the controller 500.

The modeling unit 55 includes the plasticizer 110 and a discharger 60. The configuration of the plasticizer 110 is the same as that in the first embodiment. In FIG. 11, the cooling plate 170, the heat insulating plate 179, the refrigerant channel 190, and other components shown in FIG. 5 are omitted. The hopper 30 is connected to the plasticizer 110. The discharger 60 is provided with a nozzle 61, via which the molten material is discharged, and a valve 70, which causes the molten material to be discharged or not to be discharged via the nozzle 61. The valve 70 is driven under the control of the controller 500

The stage 300 has a modeling surface 310, which faces the nozzle 61. A three-dimensionally modeled object is formed on the model surface 310. In the present embodiment, the modeling surface 310 is parallel to the horizontal direction. The stage 300 is supported by the movement mechanism 400.

The movement mechanism 400 changes the position of the modeling surface 310 relative to the nozzle 61. In the present embodiment, the movement mechanism 400 changes the position of the modeling surface 310 relative to the nozzle 61 by moving the stage 300. The movement mechanism 400 in the present embodiment is formed of a three-axis positioner that moves the stage 300 in three-axis directions, the directions X, Y, and Z, by using the power generated by three motors. The motors are each driven under the control of the controller 500. The movement mechanism 400 may instead be configured to change the position of the modeling surface 310 relative to the nozzle 61 by moving the modeling unit 55 without moving the stage 300. The movement mechanism 400 may still instead be configured to change the position of the modeling surface 310 relative to the nozzle 61 by moving both the stage 300 and the modeling unit 55.

Figure 12:
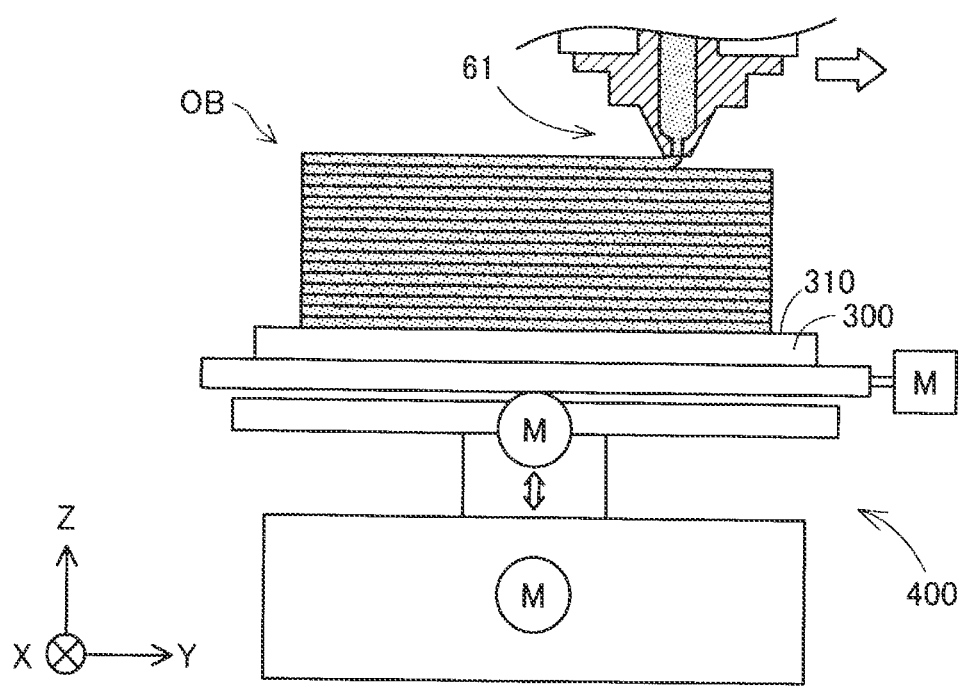
FIG. 12 is a descriptive diagram schematically showing formation of a three-dimensionally modeled object.

FIG. 12 is a descriptive diagram schematically showing how the three-dimensionally modeled object OB is formed by the three-dimensional modeling apparatus 50. Under the control of the controller 500, the three-dimensional modeling apparatus 50 discharges the molten material via the nozzle 61 while changing the position of the stage 300 relative to the nozzle 61 to laminate layers of modeling materials on the stage 300 to form a three-dimensionally modeled object OB having a desired shape.

The three-dimensional modeling apparatus 50 according to the present embodiment described above can ensure high wear resistance of each of the facing sections 501 to 504 to which the material is rubbed when the flat screw 130 rotates, and ensure that the third non-facing section 513 is readily cut.

C. Other Embodiments (C1) In the injection molding apparatus 10 according to the first embodiment and the three-dimensional modeling apparatus 50 according to the second embodiment described above, the wear suppressor 122, which is fixed to the main body 121 and has hardness higher than the hardness of the main body 121, is provided between the flat screw 130 and the main body 121 of the screw enclosure 120. Instead, the screw enclosure 120 may not be provided with the wear suppressor 122, and a wear suppressor fixed to the flat screw 130 and having hardness higher than the hardness of the flat screw 130 may be provided between the flat screw 130 and the screw enclosure 120. Still instead, the screw enclosure 120 may be provided with the wear suppressor 122, and a wear suppressor fixed to the flat screw 130 and having hardness higher than the hardness of the flat screw 130 may further be provided between the flat screw 130 and the screw enclosure 120. When the screw enclosure 120 is not provided with the wear suppressor 122, the main body 121 may be hardened to ensure wear resistance. When the wear suppressor is fixed to the flat screw 130, the flat screw 130 may not be hardened to ensure that the flat screw 130 is readily cut. That is, in this case, the hardness of the first non-facing section 511 may be lower than the hardness of the second facing section 502 provided at the surface of the wear suppressor.

(C2) In the injection molding apparatus 10 according to the first embodiment and the three-dimensional modeling apparatus 50 according to the second embodiment described above, the wear suppressor 122 is provided between the flat screw 130 and the main body 121 of the screw enclosure 120. Instead, the wear suppressor 122 may not be provided between the flat screw 130 and the main body 121 of the screw enclosure 120, and a wear suppressor fixed to the flat screw 130 and having hardness higher than the hardness of the flat screw 130 may be provided between the flat screw 130 and the barrel 140. Still instead, the wear suppressor 122 may not be provided between the flat screw 130 and the main body 121 of the screw enclosure 120, and a wear suppressor fixed to the barrel 140 and having hardness higher than the hardness of the barrel 140 may be provided between the flat screw 130 and the barrel 140. When the wear suppressor is fixed to the flat screw 130, the flat screw 130 may not be hardened to ensure that the flat screw 130 is readily cut. That is, in this case, the hardness of the first non-facing section 511 may be lower than the hardness of the first facing section 501 provided at the surface of the wear suppressor. When the wear suppressor is fixed to the barrel 140, the barrel 140 may not be hardened to ensure that the barrel 140 is readily cut. That is, in this case, the hardness of the second non-facing section 512 may be lower than the hardness of the third facing section 503 provided at the surface of the wear suppressor.

(C3) In the injection molding apparatus 10 according to the first embodiment and the three-dimensional modeling apparatus 50 according to the second embodiment described above, the wear suppressor 122 is provided between the flat screw 130 and the main body 121 of the screw enclosure 120. Instead, a wear suppressor may be provided not only between the flat screw 130 and the main body 121 of the screw enclosure 120 but between the flat screw 130 and the barrel 140. For example, the wear suppressor 122 fixed to the main body 121 and a wear suppressor fixed to the flat screw 130 and having hardness higher than the hardness of the flat screw 130 may be provided between the flat screw 130 and the main body 121 of the screw enclosure 120, and a wear suppressor fixed to the flat screw 130 and having hardness higher than the hardness of the flat screw 130 and a wear suppressor fixed to the barrel 140 and having hardness higher than the hardness of the barrel 140 may be provided between the flat screw 130 and the barrel 140.

(C4) In the injection molding apparatus 10 according to the first embodiment and the three-dimensional modeling apparatus 50 according to the second embodiment described above, the first facing section 501 and the second facing section 502 of the flat screw 130, the third facing section 503 of the barrel 140, and the fourth facing section 504 of the screw enclosure 120 are each provided at the surface of a hardened member. Instead, at least any one of the first facing section 501 and the second facing section 502 of the flat screw 130, the third facing section 503 of the barrel 140, and the fourth facing section 504 of the screw enclosure 120 may be provided at the surface of a non-hardened member. In this case, as the non-hardened member, a member made of a material having relatively high hardness, such as a titanium alloy, may be used.

(C5) In the injection molding apparatus 10 according to the first embodiment and the three-dimensional modeling apparatus 50 according to the second embodiment described above, the seal members 180 each including the planar section 181 and the protruding stripe section 182 are used to reliably seal the refrigerant channel 190. Instead, the seal members 180 do not each need to include the planar section 181 or the protruding stripe section 182. For example, a typical O-ring having a circular cross section may be used as each of the seal members 180.

(C6) In the injection molding apparatus 10 according to the first embodiment and the three-dimensional modeling apparatus 50 according to the second embodiment described above, the outer circumferential seal groove 171A and the inner circumferential seal groove 171B are so provided as to sandwich the channel groove 129. Instead, either one of the outer circumferential seal groove 171A and the inner circumferential seal groove 171B may not be provided.

(C7) In the injection molding apparatus 10 according to the first embodiment and the three-dimensional modeling apparatus 50 according to the second embodiment described above, the attachment sections 175, which are part of the cooling plate 170, are in contact with the barrel 140. Instead, the cooling plate 170 does not need to have a portion in contact with the barrel 140.

D. Other Aspects

The present disclosure is not limited to the embodiments described above and can be achieved in a variety of aspects to the extent that the aspects do not depart from the substance of the present disclosure. For example, the present disclosure can be achieved by the aspects below. The technical features in the embodiments described above that correspond to the technical features in the aspects described below can be replaced by or combined with other technical features as appropriate to solve part or entirety of the problems in the present disclosure or achieve part or entirety of the effects of the present disclosure. Further, when any of the technical features has not been described as an essential feature in the present specification, the technical feature can be deleted as appropriate.

(1) According to a first aspect of the present disclosure, a plasticizing apparatus is provided. The plasticizing apparatus includes a drive motor, a rotor rotated by the drive motor and having a groove-forming surface provided with a groove, a barrel facing the groove-forming surface and having a communication hole, an enclosure that accommodates the rotor, a heating section that heats a material supplied to the portion between the rotor and the barrel, and a wear suppressor provided in at least one of the portion between the rotor and the barrel and the portion between the rotor and the enclosure. When the wear suppressor is provided between the rotor and the barrel, the wear suppressor is fixed to the rotor or the barrel and has Vickers hardness higher than the Vickers hardness of one of the rotor and the barrel, the one to which the wear suppressor is fixed, whereas when the wear suppressor is provided between the rotor and the enclosure, the wear suppressing portion is fixed to the rotor or the enclosure and has Vickers hardness higher than the Vickers hardness of one of the rotor and the enclosure, the one to which the wear suppressor is fixed.

The plasticizing apparatus according to the aspect can ensure that the rotor is readily cut while suppressing the wear of the portion facing the barrel when the wear suppressor provided between the rotor and the barrel is fixed to the rotor, can ensure that the barrel is readily cut while suppressing the wear of the portion facing the rotor when the wear suppressor provided between the rotor and the barrel is fixed to the barrel, can ensure that the rotor is readily cut while suppressing the wear of the portion facing the enclosure when the wear suppressor provided between the rotor and the enclosure is fixed to the rotor, and can ensure that the enclosure is readily cut while suppressing the wear of the portion facing the rotor when the wear suppressor provided between the rotor and the enclosure is fixed to the enclosure.

(2) In the plasticizing apparatus according to the aspect described above, the wear suppressor may be formed of a hardened member.

The plasticizing apparatus according to the aspect, the wear of a portion provided with the wear suppressor can be effectively suppressed.

(3) The plasticizing apparatus according to the aspect described above may include a lid member provided with a seal groove and a planar surface and a seal member disposed in the seal groove. The enclosure may include a channel groove provided along the circumferential direction of the rotor. The lid member may be so disposed that the planar surface covers the channel groove to define a refrigerant channel along which a refrigerant flows and the seal groove is disposed along the channel groove. The seal member may include a planar section and a protruding stripe section and may be disposed in the seal groove to seal the refrigerant channel in such a way that the planar section is in contact with the bottom surface of the seal groove and the protruding stripe section is in contact with a surface of the enclosure that is the surface along the channel groove.

The plasticizing apparatus according to the aspect, in which the planar section of the seal member is in contact with the bottom surface of the seal groove, can readily ensure the contact area where the seal member is in contact with the bottom surface of the seal groove as compared with a seal member having a circular cross section. Further, the plasticizing apparatus according to the aspect, in which the protruding stripe section is in contact with the enclosure, can suppress the situation in which the seal member is caught between the enclosure and the lid member when the lid member covers the channel groove of the enclosure.

(4) In the plasticizing apparatus according to the aspect described above, the lid member may be provided with a plurality of the seal grooves that sandwich the channel groove, and the seal member may be disposed in each of the seal grooves.

The plasticizing apparatus according to the aspect, in which the plurality of seal members are so disposed as to sandwich the channel groove, allows the refrigerant channel to be sealed with improved reliability.

(5) In the plasticizing apparatus according to the aspect described above, part of the lid member may be in contact with the barrel.

The plasticizing apparatus according to the aspect, in which heat of the barrel is effectively transferred to the refrigerant via the lid member, allows an outer circumferential portion of the barrel to be kept at a temperature lower than the temperature at a central portion of the barrel. The material can therefore be stably plasticized in the portion between the rotor and the barrel, whereby the plasticized material can be stably discharged via communication hole.

(6) According to a second aspect of the present disclosure, an injection molding apparatus is provided. The injection molding apparatus includes a plasticizer that plasticizes a material and a nozzle via which the material plasticized by the plasticizer is injected into a molding die. The plasticizer includes a drive motor, a rotor rotated by the drive motor and having a groove-forming surface provided with a groove, a barrel facing the groove-forming surface and having a communication hole, an enclosure that accommodates the rotor, a heating section that heats the material supplied to the portion between the rotor and the barrel, and a wear suppressor provided in at least one of the portion between the rotor and the barrel and the portion between the rotor and the enclosure. When the wear suppressor is provided between the rotor and the barrel, the wear suppressor is fixed to the rotor or the barrel and has Vickers hardness higher than the Vickers hardness of one of the rotor and the barrel, the one to which the wear suppressor is fixed, whereas when the wear suppressor is provided between the rotor and the enclosure, the wear suppressor is fixed to the rotor or the enclosure and has Vickers hardness higher than the Vickers hardness of one of the rotor and the enclosure, the one to which the wear suppressor is fixed.

The injection molding apparatus according to the aspect can ensure that the rotor is readily cut while suppressing the wear of the portion facing the barrel when the wear suppressor provided between the rotor and the barrel is fixed to the rotor, can ensure that the barrel is readily cut while suppressing the wear of the portion facing the rotor when the wear suppressor provided between the rotor and the barrel is fixed to the barrel, can ensure that the rotor is readily cut while suppressing the wear of the portion facing the enclosure when the wear suppressor provided between the rotor and the enclosure is fixed to the rotor, and can ensure that the enclosure is readily cut while suppressing the wear of the portion facing the rotor when the wear suppressor provided between the rotor and the enclosure is fixed to the enclosure.

(7) According to a third aspect of the present disclosure, a three-dimensional modeling apparatus is provided. The three-dimensional modeling apparatus includes a plasticizer that plasticizes a material and a nozzle via which the material plasticized by the plasticizer is discharged onto a stage. The plasticizer includes a drive motor, a rotor rotated by the drive motor and having a groove-forming surface provided with a groove, a barrel facing the groove-forming surface and having a communication hole, an enclosure that accommodates the rotor, a heating section that heats the material supplied to the portion between the rotor and the barrel, and a wear suppressor provided in at least one of the portion between the rotor and the barrel and the portion between the rotor and the enclosure. When the wear suppressor is provided between the rotor and the barrel, the wear suppressor is fixed to the rotor or the barrel and has Vickers hardness higher than the Vickers hardness of one of the rotor and the barrel, the one to which the wear suppressor is fixed, whereas when the wear suppressor is provided between the rotor and the enclosure, the wear suppressing portion is fixed to the rotor or the enclosure and has Vickers hardness higher than the Vickers hardness of one of the rotor and the enclosure, the one to which the wear suppressor is fixed.

The three-dimensional modeling apparatus according to the aspect can ensure that the rotor is readily cut while suppressing the wear of the portion facing the barrel when the wear suppressor provided between the rotor and the barrel is fixed to the rotor, can ensure that the barrel is readily cut while suppressing the wear of the portion facing the rotor when the wear suppressor provided between the rotor and the barrel is fixed to the barrel, can ensure that the rotor is readily cut while suppressing the wear of the portion facing the enclosure when the wear suppressor provided between the rotor and the enclosure is fixed to the rotor, and can ensure that the enclosure is readily cut while suppressing the wear of the portion facing the rotor when the wear suppressor provided between the rotor and the enclosure is fixed to the enclosure.

The present disclosure can also be implemented in a variety of aspects other than a plasticizing apparatus. For example, the present disclosure can be implemented in the form of an injection molding apparatus and a three-dimensional modeling apparatus.

What is claimed is:

1. A plasticizing apparatus comprising:
a drive motor;
a rotor rotated by the drive motor and having a groove-forming surface provided with a groove;
a barrel facing the groove-forming surface and having a communication hole;
an enclosure that accommodates the rotor;
a heating section that heats a material supplied to a portion between the rotor and the barrel;
a wear suppressor provided in at least one of the portion between the rotor and the barrel and a portion between the rotor and the enclosure; and
a lid member provided with a seal groove and a planar surface and a seal member disposed in the seal groove,
wherein when the wear suppressor is provided between the rotor and the barrel, the wear suppressor is fixed to at least one of the rotor and the barrel and has a Vickers hardness higher than a Vickers hardness of the at least one of the rotor and the barrel, to which the wear suppressor is fixed,
wherein when the wear suppressor is provided between the rotor and the enclosure, the wear suppressor is fixed to at least one of the rotor and the enclosure and has a Vickers hardness higher than a Vickers hardness of the at least one of the rotor and the enclosure to which the wear suppressor is fixed,
the enclosure includes a channel groove provided along a circumferential direction of the rotor,
the lid member is disposed so that the planar surface covers the channel groove to define a refrigerant channel along which a refrigerant flows and the seal groove is disposed along the channel groove, and
the seal member includes a planar section and a protruding stripe section and is disposed in the seal groove to seal the refrigerant channel so that the planar section is in contact with a bottom surface of the seal groove and the protruding stripe section is in contact with a surface of the enclosure that is a surface along the channel groove.

2. The plasticizing apparatus according to claim 1, wherein the wear suppressor is formed of a hardened member.

3. The plasticizing apparatus according to claim 1, wherein the lid member is provided with a plurality of the seal grooves that sandwich the channel groove, and the seal member is disposed in each of the seal grooves.

4. The plasticizing apparatus according to claim 1, wherein part of the lid member is in contact with the barrel.

5. An injection molding apparatus comprising:
a plasticizer that plasticizes a material; and
a nozzle via which the material plasticized by the plasticizer is injected into a molding die,
wherein the plasticizer includes
a drive motor,
a rotor rotated by the drive motor and having a groove-forming surface provided with a groove,
a barrel facing the groove-forming surface and having a communication hole,
an enclosure that accommodates the rotor,
a heating section that heats the material supplied to a portion between the rotor and the barrel,
a wear suppressor provided in at least one of the portion between the rotor and the barrel and a portion between the rotor and the enclosure, and
a lid member provided with a seal groove and a planar surface and a seal member disposed in the seal groove,
when the wear suppressor is provided between the rotor and the barrel, the wear suppressor is fixed to at least one of the rotor and the barrel and has a Vickers hardness higher than a Vickers hardness of the at least one of the rotor and the barrel, to which the wear suppressor is fixed,
when the wear suppressor is provided between the rotor and the enclosure, the wear suppressor is fixed to at least one of the rotor and the enclosure and has a Vickers hardness higher than a Vickers hardness of the at least one of the rotor and the enclosure, to which the wear suppressor is fixed,
the enclosure includes a channel groove provided along a circumferential direction of the rotor,
the lid member is disposed so that the planar surface covers the channel groove to define a refrigerant channel along which a refrigerant flows and the seal groove is disposed along the channel groove and
the seal member includes a planar section and a protruding stripe section and is disposed in the seal groove to seal the refrigerant channel so that the planar section is in contact with a bottom surface of the seal groove and the protruding stripe section is in contact with a surface of the enclosure that is a surface along the channel groove.

6. A three-dimensional modeling apparatus comprising:
a plasticizer that plasticizes a material; and
a nozzle via which the material plasticized by the plasticizer is discharged onto a stage,
wherein the plasticizer includes
a drive motor,
a rotor rotated by the drive motor and having a groove-forming surface provided with a groove,
a barrel facing the groove-forming surface and having a communication hole,
an enclosure that accommodates the rotor,
a heating section that heats the material supplied to a portion between the rotor and the barrel,
a wear suppressor provided in at least one of the portion between the rotor and the barrel and a portion between the rotor and the enclosure, and
a lid member provided with a seal groove and a planar surface and a seal member disposed in the seal groove,
when the wear suppressor is provided between the rotor and the barrel, the wear suppressor is fixed to at least one of the rotor or the barrel and has a Vickers hardness higher than a Vickers hardness of the at least one of the rotor and the barrel to which the wear suppressor is fixed,
when the wear suppressor is provided between the rotor and the enclosure, the wear suppressor is fixed to at least one of the rotor or the enclosure and has a Vickers hardness higher than a Vickers hardness of the at least one of the rotor and the enclosure to which the wear suppressor is fixed,
the enclosure includes a channel groove provided along a circumferential direction of the rotor,
the lid member is disposed so that the planar surface covers the channel groove to define a refrigerant channel along which a refrigerant flows and the seal groove is disposed along the channel groove, and
the seal member includes a planar section and a protruding stripe section and is disposed in the seal groove to seal the refrigerant channel so that the planar section is in contact with a bottom surface of the seal groove and the protruding stripe section is in contact with a surface of the enclosure that is a surface along the channel groove.

* * * * *